(Model.)
2 Sheets—Sheet 1.
J. H. BARLOW.
Machine for Feeding Cartridge Shells.
No. 233,062. Patented Oct. 12, 1880.
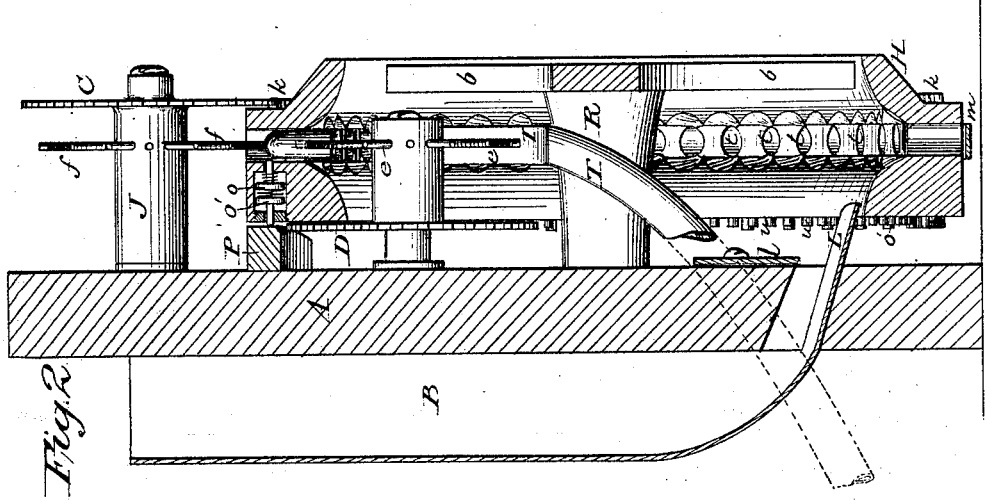
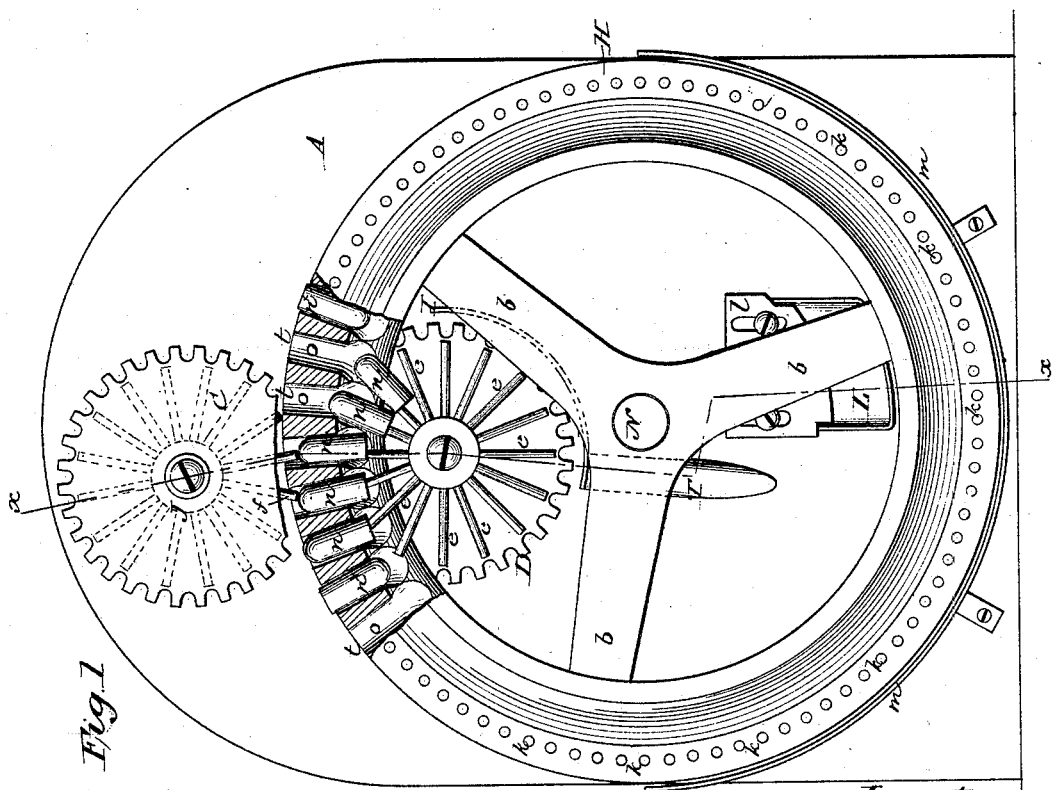
Attest:
Sidney P. Hollingsworth,
William W. Dodge.
Inventor:
J. H. Barlow,
by Dodge & Son,
Attys.

(Model.) 2 Sheets—Sheet 2.
J. H. BARLOW.
Machine for Feeding Cartridge Shells.
No. 233,062. Patented Oct. 12, 1880.
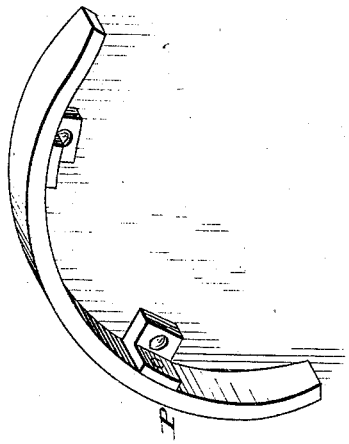
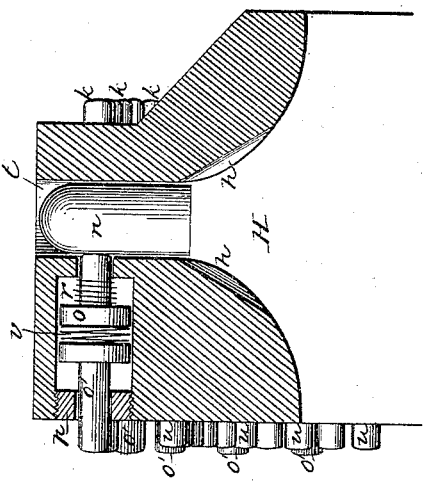
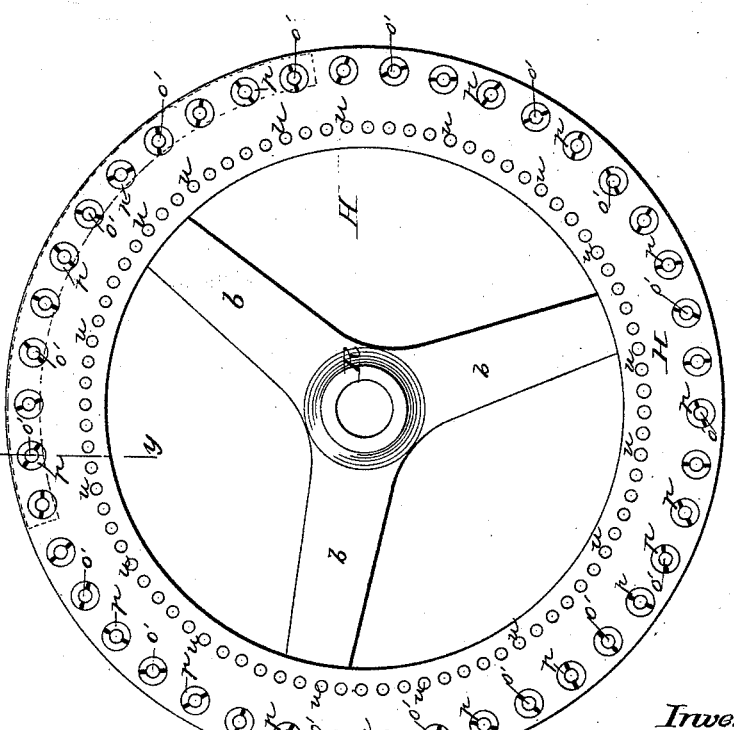
Attest:
Sidney P. Hollingsworth,
William W. Dodge.
Inventor:
J. H. Barlow,
By Dodge & Son,
Att'ys

UNITED STATES PATENT OFFICE.

JOHN H. BARLOW, OF NEW HAVEN, CONNECTICUT, ASSIGNOR TO THE WINCHESTER REPEATING ARMS COMPANY, OF SAME PLACE.

MACHINE FOR FEEDING CARTRIDGE-SHELLS.

SPECIFICATION forming part of Letters Patent No. 233,062, dated October 12, 1880.

Application filed June 2, 1880. (Model.)

*To all whom it may concern:*

Be it known that I, JOHN H. BARLOW, of New Haven, in the county of New Haven and State of Connecticut, have invented certain Improvements in Machines for Feeding Cartridge-Shells, of which the following is a specification.

My invention relates to devices for automatically feeding cartridge-shells and similar articles either into tubes or direct to the machines which are to operate upon them; and the invention consists, first, in a rotating hopper of novel construction, and in means for clamping the shells or blanks in cells or holes in the hopper, together with a series of rotating arms arranged to push them out at the proper time; also, in a carrying-wheel arranged to receive them from the cells of the hopper and transfer them to a tube, together with certain details of construction, all as hereinafter more fully described.

Figure 1 is a front elevation of a machine embodying my invention. Fig. 2 is a vertical section on the line $x\ x$ of Fig. 1. Fig. 3 is a rear face view of the rotating hopper shown detached. Fig. 4 is a transverse section of the hopper on the line $y\ y$ of Fig. 3, and Fig. 5 is a perspective view of the curved cam-plate detached.

To construct a machine or feeder on my plan I first provide the rotating hopper H, which consists of an annular wheel, preferably of wood, with an interior recess or groove extending centrally entirely around it, the form of this internal recess or groove being shown in Fig. 2 and enlarged in Fig. 4. A series of holes are bored radially from the periphery inward through the hopper, so as to form a series of cells reaching from the bottom of the annular groove out through the rim of the hopper, as shown clearly at $t$, Fig. 4, and also in Fig. 1, there being grooves $h$ cut in the converging walls of the hopper H, opposite the mouth of each hole or cell $t$, to facilitate the entry of the shells into the holes. This annular hopper is connected by three or more arms, $b$, to a central hub, R, by which it is mounted on an axis secured to a suitable upright, A, to the back of which is secured a stationary hopper or chute, B, which has a spout, L, at its lower end, which spout projects through an opening in the standard A, as shown in Figs. 1 and 2, far enough to deliver the shells to the interior of the hopper H at or near its lower side, there being a slide, $l$, arranged to close the mouth of the spout or passage more or less, as may be desired. Opposite each cell $t$ is a clamping device for holding the shell therein until it has been carried to the place of delivery, this device, as shown in Fig. 4, consisting of a small flat-headed bolt or pin, $o$, having on its shank a spiral spring, $r$, which tends to draw the point of the pin back out of the cell $t$, and another similar pin, $o'$, with another spring, $v$, placed between the heads of the two. These pins, with their springs, are inserted in a hole bored at right angles to the cell $t$, and are held in by a flush nut or washer, $p$, as represented in Figs. 3 and 4, there being one opposite each cell in the hopper.

A guard-plate, $m$, is arranged concentrically around the lower half of the hopper H, as shown in Figs. 1 and 2, to prevent the shells from falling through the holes $t$ previous to their being held by the clamps; and in rear of the hopper H there is secured a curved cam, P, (shown detached in Fig. 5 and in section in place in Fig. 2,) so located that as the hopper rotates the projecting ends of the pins $o'$ will bear against this cam, thereby causing the inner ends or points of the pins $o$ to protrude slightly into the cells or holes $t$, and by pressing against the shells therein clamp or hold them from dropping out as they are carried up to the vertical position. This cam P extends from a point near the end of guard $m$ on the left up and around to a point a little beyond the center at the top of the hopper, and as the pins $o'$ bear against its face nearly its whole length it follows that the shells are held by the spring-clamps until they clear the cam P, the ends of which are inclined, as shown, to permit the pins to ride up on its face and off gradually.

By means of the springs $r$ the points of pins $o$ are forced back out of the way while the cells or holes $t$ are passing through that portion of the circle which is not covered by the cam P, and at the same time, when the pins are passing along the face of the cam, the other springs, v, permit the pins to be forced inward with sufficient force to hold the shells fast without indenting or bruising them.

It is obvious that instead of this form of clamping device a flat spring having its free end bent at right angles, or at such an angle that its point will bear against the shell, may be substituted, provided the cam is made to bear against the spring-arms at such a point as to admit of a slight yielding of the arm between the cam and the point where it bears against the shell; or, instead of locating the spring v between the pins o and o', springs may be placed behind the cam, which will produce the same results; but the plan shown is preferred as the better mechanical arrangement.

Directly over the top of the hopper H is located a push-wheel consisting of a series of rods or arms, f, which project radially from a shaft or hub, J, Figs. 1 and 2, the arms f being of such a length and so arranged that as they are rotated their ends will enter the holes t far enough to push the shells out of contact with the clamp. Motion is imparted to the push-wheel or arms f by a wheel, C, secured to the same shaft J, and engaging with a series of pins, k, projecting from the face of the hopper, as shown in Fig. 2, though it is obvious that any other style of gearing may be used, it only being necessary that the parts shall be so geared or arranged as to cause the end of an arm, f, to enter each cell t as they come around.

Another and similar wheel, with radial arms e, is mounted directly below the one above described in such a position that its arms e will receive the shells as they are forced out of the cells by the arms f, as shown in Figs. 1 and 2, this receiving or carrying wheel being driven, like the other, by a wheel, D, which engages with a series of pins, u, on the back side of the hopper H, as shown in Figs. 2, 3, and 4. Directly below this receiving and carrying wheel is placed an open-ended tube, T, which extends downward and out at one side within the central space of the hopper, as shown in Figs. 1 and 2, and from its upper end a guard-plate, I, extends around the right-hand side of the carrying-wheel, as shown in Figs. 1 and 2, to prevent the shells from dropping off the arms e while passing from the horizontal position to the mouth of tube T.

The operation of the device is as follows: The shells are thrown loosely into the reservoir or chute B, from whence they pass through spout L into the hopper H. As the hopper rotates, the shells are tumbled about and fall endwise into the cells t, generally with their closed ends outward toward the periphery, as the closed ends of the shells are the heavier. As the hopper rotates, the shells in the cells are carried around until they reach the end of cam P, when they are clamped and held fast by the pins o, the guard-plate m having prevented the shells from dropping through while passing upward to the cam. As the hopper continues to rotate, the shells, being held in by the clamping-pins, are carried around until they are brought under the arms f of the push-wheel, when the arms push them out of contact with the clamp-pins, when they fall mouth down upon the arms e, which carry them around until they come opposite the mouth of the receiving-tube T, into which they drop and are conveyed to the desired receptacle or point.

In case a shell is received in one of the cells t with its open end outward, as shown at $n^x$, Fig. 1, it is obvious that the arms f will not operate to push it out, but it will remain in the cell, held fast by the clamp-pin, until it has been carried past the cam P, when it will be released and will fall back into the hopper. It is obvious that this hopper may be used for the purpose of receiving or picking up and conveying the shells to a greater or less distance without the clamping device or the push or receiving wheels, by simply arranging a trough or spout into which the shells may slide from the cells, either inward or outward, and that it may be used with the clamping device independently of the pushing and receiving wheels by simply locating the mouth of the tube T at the proper point to receive the shells as they are released from the clamp, the mouth of the tube being suitably enlarged or shaped so as to receive them, and therefore I do not wish to be understood as limiting myself to the combination or arrangement of all the parts as here shown; but by the construction shown I am enabled to produce an automatic feed which is positive in its operations, and by which the shells are always fed one end foremost.

Having thus described my invention, what I claim is—

1. A rotating hopper provided with the internal annular groove or recess and the radial cells t, for receiving and conveying cartridge-shells and similar articles, substantially as described.

2. In combination with the annular rotating hopper H, provided with radial cells for receiving and conveying the shells, the spring clamping-pins or equivalent devices for clamping or holding the shells in the cells, and the cam P, arranged to operate upon said clamping devices and release the shells at the proper time, substantially as described.

3. In combination with the rotating hopper H, provided with a spring-clamp arranged to hold the shells during a part of its revolution and release them during another part, the push-wheel or arms f, arranged to push the shells from contact with the clamping device, substantially as described.

4. In combination with the rotating hopper, provided with a spring-clamp arranged to hold the shells, a push-wheel or series of arms for pushing the shells out of the cells, and a receiving-wheel or series of arms, e, for receiving and delivering the shells to a trough or tube, substantially as described.

5. In combination with the annular rotating hopper H, provided with radial cells for receiving and carrying the shells, the stationary hopper or reservoir B, having its chute or mouth arranged to deliver the shells within the annular hopper H, substantially as shown and described.

6. The automatic feeding device, consisting of the rotating hopper H, the clamping device for holding the shells in the cells, the push-arms $f$, receiving-arms $e$, guard I, and spout T, all constructed and arranged to operate substantially as described.

JOHN H. BARLOW.

Witnesses:
DANIEL H. VEADER,
T. L. BURNETT.